(12) United States Patent
Matsuike

(10) Patent No.: US 10,901,496 B2
(45) Date of Patent: Jan. 26, 2021

(54) IMAGE PROCESSING APPARATUS, IMAGE PROCESSING METHOD, AND PROGRAM

(71) Applicant: Sony Interactive Entertainment Inc., Tokyo (JP)

(72) Inventor: Hiroshi Matsuike, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 124 days.

(21) Appl. No.: 16/300,384

(22) PCT Filed: May 19, 2017

(86) PCT No.: PCT/JP2017/018899
§ 371 (c)(1),
(2) Date: Nov. 9, 2018

(87) PCT Pub. No.: WO2017/204120
PCT Pub. Date: Nov. 30, 2017

(65) Prior Publication Data
US 2019/0121426 A1  Apr. 25, 2019

(30) Foreign Application Priority Data
May 25, 2016 (JP) ................. 2016-104386

(51) Int. Cl.
*G06F 3/01* (2006.01)
*G06T 19/00* (2011.01)
(Continued)

(52) U.S. Cl.
CPC ............... *G06F 3/011* (2013.01); *G06F 3/01* (2013.01); *G06F 3/0481* (2013.01);
(Continued)

(58) Field of Classification Search
CPC combination set(s) only.
See application file for complete search history.

(56) References Cited

U.S. PATENT DOCUMENTS

2012/0249741 A1* 10/2012 Maciocci ............. G06T 15/503
348/46
2014/0015831 A1  1/2014 Kim
(Continued)

FOREIGN PATENT DOCUMENTS

| JP | 2009042796 A | 2/2009 |
| JP | 2014139767 A | 7/2014 |

OTHER PUBLICATIONS

X. Wang, "Real-virtual components interaction for assembly simulation and planning"—Robotics and Computer-Integrated Manufacturing, 41(2016), Mar. 25, 2016, pp. 104-113.*
(Continued)

*Primary Examiner* — Omar S Ismail
(74) *Attorney, Agent, or Firm* — Matthew B. Dernier, Esq.

(57) ABSTRACT

While a user is enabled to intuitively manipulate an object in a virtual reality space, the amount of computation necessary for realizing these manipulations is reduced. An image processing apparatus acquires a motion of a finger of a hand, detects contact between the finger and an object in a virtual space, detects the number of fingers touching the object in the virtual space and, on the basis of the detected number of fingers, determines an interaction parameter for obtaining an interaction between the finger and the object, computes a motion of the object on the basis of the determined interaction parameter, and draws an object with the motion computed.

9 Claims, 11 Drawing Sheets

(51) Int. Cl.
  *G06F 3/0481* (2013.01)
  *G06T 7/215* (2017.01)
  *G06K 9/00* (2006.01)

(52) U.S. Cl.
  CPC ..... *G06F 3/04815* (2013.01); *G06K 9/00013* (2013.01); *G06K 9/00355* (2013.01); *G06T 7/215* (2017.01); *G06T 19/00* (2013.01)

(56) References Cited

U.S. PATENT DOCUMENTS

| | | | | |
|---|---|---|---|---|
| 2015/0062003 A1* | 3/2015 | Rafii | ...................... | G06F 3/017 345/156 |
| 2015/0153833 A1* | 6/2015 | Pinault | .................... | G06F 3/017 345/156 |
| 2015/0177842 A1* | 6/2015 | Rudenko | ................. | G06F 21/32 345/156 |
| 2015/0338915 A1* | 11/2015 | Publicover | ......... | H04N 5/44504 345/633 |
| 2019/0258320 A1* | 8/2019 | Yang | ..................... | G06T 19/006 |

OTHER PUBLICATIONS

Anthony Talvas, "Aggregate Constraints for Virtual Manipulation with Soft Fingers", IEEE Transactions on Visualization and Computer Graphics, Vol. 21, No. 4, Apr. 2015, pp. 452-459.*
Supplementary European Search Report for EP Application No. 17802712, 9 pages, dated Dec. 5, 2019 (This is being re-cited in order to correct the date of NPL #1 in the IDS filed on Dec. 20, 2019. NPL #1 was previously uploaded on Dec. 20, 2019.).
International Preliminary Report on Patentability and Written Opinion for corresponding PCT Application No. PCT/JP2017/018899, 6 pages, dated Nov. 27, 2018.
Anthony Talvas, Maud Marchal, Christian Duriez and Miguel A. Otaduy, "Aggregate Constraints for Virtual Manipulation with Soft Fingers," 10 pages, Mar. 27, 2015.
C. B. Zilles and J. K. Salisbury, "A constraint-based god-object method for haptic display," Intelligent Robots and Systems 95. 'Human Robot Interaction and Cooperative Robots,' Proceedings. 1995 IEEE/RSJ International Conference, proceedings of IROS-95, Pittsburgh, Aug. 6-9, 1995, vol. 3, pp. 146-151, 6 pages, Aug. 1995.
International Preliminary Report on Patentability for corresponding PCT Application No. PCT/JP2017/018899, 3 pages, dated Jun. 13, 2017.
Yuji Matsuo, Koichi Yoshida, VR Kukannai de Te' 0 Tsukatta Interaction 0 Jitsugen suru Tame no Hoho, CEDEC 2016, Sony Interactive Entertainment Inc., 52 pages, dated Aug. 26, 2016, (For relevancy see International Preliminary Report on Patentability for corresponding PCT Application No. PCT/JP2017/018899, 3 pages cited above).
Anthony Talvas, Maud Marchal, Christian Duriez and Miguel A. Otaduy, "Aggregate Constraints for Virtual Manipulation with Soft Fingers," Mar. 27, 2015.
Abstract of C. B. Zilles and J. K. Salisbury, "A constraint-based god-object method for haptic display," Intelligent Robots and Systems 95. 'Human Robot Interaction and Cooperative Robots,' Proceedings. 1995 IEEE/RSJ International Conference on, Aug. 1995.
Supplementary European Search Report for EP Application No. 17802712, 9 pages, dated 17802712.4.
Martinet A et al: "Integrality and Separability of Multitouch Interaction Techniques in 3D Manipulation Tasks" IEEE Transactions on Visualization and Computer Graphics, IEEE Service Center, Los Alamitos, CA., US., vol. 18, No. 3, pp. 369-380, Mar. 1, 2012.

* cited by examiner one finger : touch two fingers : fric three fingers : fix

FIG.16
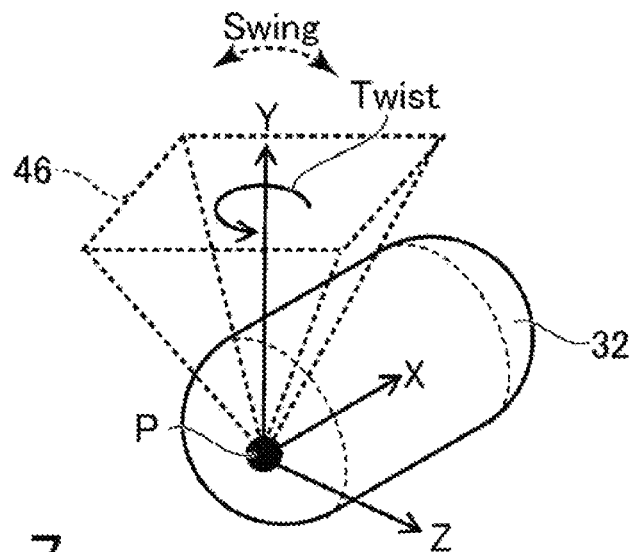
FIG.17
| ELEMENT | TYPE | REMARKS |
|---|---|---|
| Linear X | Lock | FRICTION |
| Linear Y | Limit | REACTION |
| Linear Z | Lock | FRICTION |
| Twist | Limit | |
| Swing | Limit | |
FIG.18
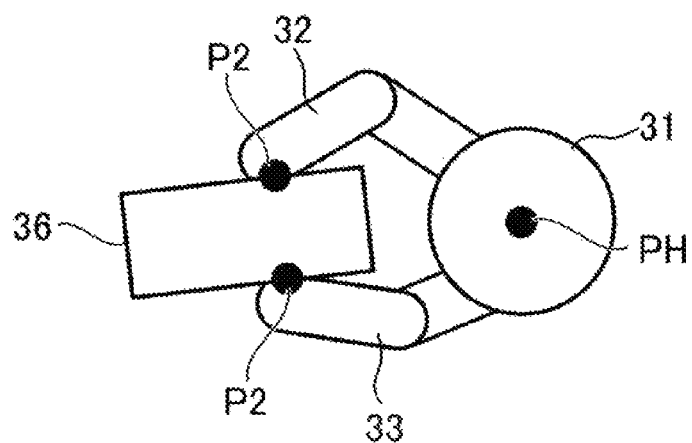

IMAGE PROCESSING APPARATUS, IMAGE PROCESSING METHOD, AND PROGRAM

TECHNICAL FIELD

The present invention relates to an image processing apparatus, an image processing method, and a program.

BACKGROUND ART

Recently, the development of technologies for enabling virtual reality experiences by use of motion capture capabilities (data gloves, for example), a head-mounted display, or the like is actively practiced. In addition, a technology is available in which an object inside a virtual reality space is manipulated by capturing the motions of hand fingers by the motion capture capabilities and in accordance with the captured motions of fingers.

NPL 1 below discloses the simulation of the friction on a contact surface by simulating the deformation of a finger by use of the finite element method and aggregating a mass of collision points between the deformed finger and an object into a single representative constraint. NPL 2 discloses the acquisition of the position of a so-called God-object of a hand.

CITATION LIST

Non Patent Literature

[NPL 1] Anthony Talvas, Maud Marchal, Christian Duriez and Miguel A. Otaduy, "Aggregate Constraints for Virtual Manipulation with Soft Fingers," Mar. 27, 2015

[NPL 2] C. B Zilles and J. K. Salisbury, "A constraint-based god-object method for haptic display," Intelligent Robots and Systems 95. 'Human Robot Interaction and Cooperative Robots,' Proceedings. 1995 IEEE/RSJ International Conference on, August 1995

SUMMARY

Technical Problem

As described in NPL 1, for example, trying to correctly simulate a force that is applied from a finger to an object requires huge amounts of the computation necessary for the simulation. Therefore, it is desired to simplify the computation necessary for the simulation, while ensuring not to hamper the user's intuitive manipulation of an object.

Therefore, it is an object of the present invention to solve the above-mentioned problem by providing a technology of enabling a user to intuitively manipulate an object inside a virtual reality space, while reducing the amounts of the computation necessary for realizing the manipulation.

Solution to Problem

In carrying out the invention and according to one aspect thereof, there is provided an image processing apparatus. The image processing apparatus includes acquisition means for acquiring a motion of a finger of a hand, contact detection means for detecting contact between the finger and an object in a virtual space, parameter determination means for detecting the number of fingers touching the object in a virtual space and, on the basis of the detected number of fingers, determining an interaction parameter for obtaining an interaction between the finger and the object, computation means for computing a motion of the object on the basis of the determined interaction parameter, and drawing means for drawing an object with the motion computed.

In carrying out the invention and according to another aspect thereof, there is provided an image processing method. The image processing method includes a step of acquiring a motion of a finger of a hand, a step of detecting contact between the finger and an object in a virtual space, a step of detecting the number of fingers touching the object in a virtual space and, on the basis of the detected number of fingers, determining an interaction parameter for obtaining an interaction between the finger and the object, a step of computing a motion of the object on the basis of the determined interaction parameter, and a step of drawing an object with the motion computed.

In carrying out the invention and according to still another aspect thereof, there is provided a program. The program has a computer execute processing operations of acquiring a motion of a finger of a hand, detecting contact between the finger and an object in a virtual space, detecting the number of fingers touching the object in a virtual space and, on the basis of the detected number of fingers, determining an interaction parameter for obtaining an interaction between the finger and the object, computing a motion of the object on the basis of the determined interaction parameter, and drawing an object with the motion computed.

According to the present invention, while a user is enabled to intuitively manipulate an object in a virtual reality space, the amount of computation necessary for realizing these manipulations is reduced.

In one embodiment of the present invention, the parameter determination means may determine the interaction parameter on the basis of a size of superimposition between the finger and an object.

In another embodiment of the present invention, an interaction parameter for obtaining a force applied between the finger and the object may include a friction parameter applied to friction, the parameter determination means may compute the friction parameter on the basis of a friction coefficient determined in accordance with the number of fingers and a size of superimposition between the finger and an object, and the computation means may compute a motion of the object on the basis of the friction parameter.

In still another embodiment of the present invention, the parameter determination means may determine constraint conditions in accordance with the interaction parameter, the constraint conditions constraining between a hand to which the finger belongs and the object, and the computation means may compute a motion of the object such that the constraint conditions are satisfied.

In yet another embodiment of the present invention, if a travel amount of the finger after detection of contact between the finger and the object is in excess of a predetermined threshold value and there is superimposition between the finger and the object, the contact detection means may not detect the contact between the finger and the object.

In a different embodiment of the present invention, on the basis of an actual finger angle at a time when contact between the finger and the object is first detected and the actual finger angle of current time, the contact detection means may determine finger angle for use in detection of contact so as to detect contact between the finger and the object on the basis of the determined finger angle.

In a still difference embodiment of the present invention, if the number of the detected fingers is three or more, the parameter determination means may determine constraint conditions for fixing a relative position between the object and a hand to which the finger belongs and the computation means may compute a motion of the object such that the constraint conditions are satisfied.

In a yet different embodiment of the present invention, if a motion of the object is computed such that constraint conditions for fixing a relative position between the object and a hand to which the fingers belong in a last frame are satisfied and there is contact between the object and any one of the fingers in a current frame, the parameter determination means may determine constraint conditions for fixing a relative position of the object and a hand to which the fingers belong.

BRIEF DESCRIPTION OF DRAWINGS

FIG. 16 is a diagram for describing constraint elements for an object.

FIG. 17 is a diagram illustrating a constraint technique in accordance with the constraint elements of an object.

FIG. 18 is a diagram for describing a relation between an object and a hand.

DESCRIPTION OF EMBODIMENT

In what follows, an embodiment of the present invention will be described with reference to drawings. Of the components that will emerge, those having the same functions are denoted by the same reference symbols and the description of the components having the same reference symbols will be skipped.

In the present embodiment, an image processing apparatus 1 that enables to move a hand and fingers inside a virtual space in accordance with the position and angle of a hand and fingers of an actual user and touch or move an object inside the virtual space with the hand and fingers in the virtual space is described.

Figure 1:
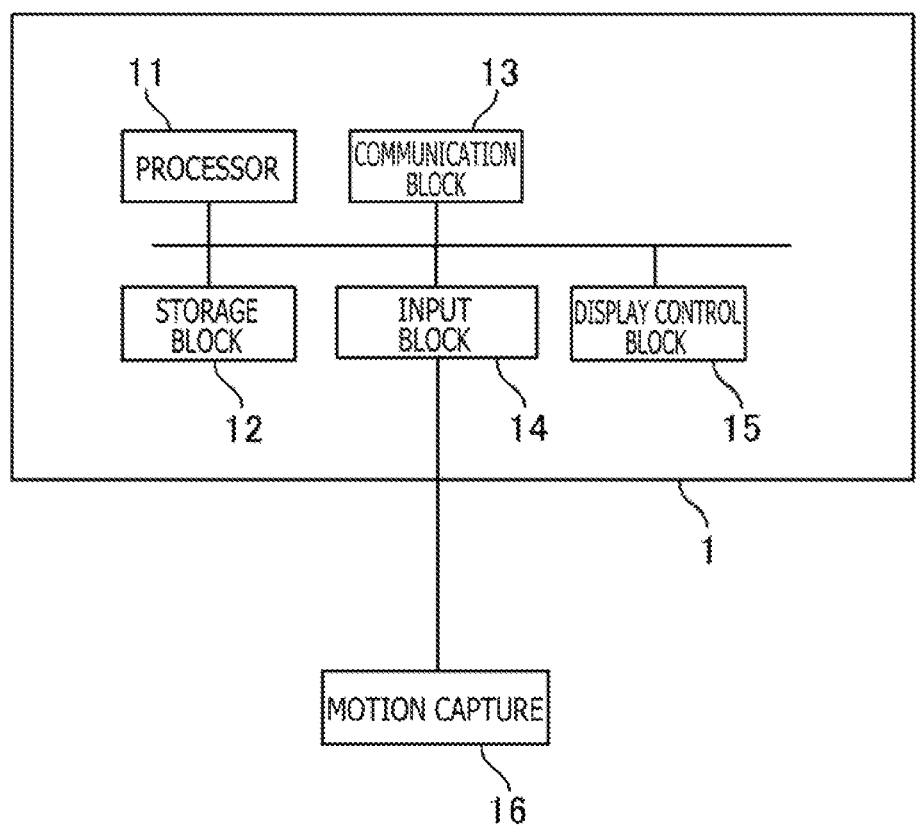
FIG. 1 is a diagram illustrating one example of a hardware configuration of an image processing apparatus practiced as one embodiment of the present invention.

FIG. 1 is a diagram illustrating one example of a hardware configuration of the image processing apparatus 1 practiced as one embodiment of the present invention. The image processing apparatus 1 is a personal computer, home game machine, or a mobile terminal. The image processing apparatus 1 includes a processor 11, a storage block 12, a communication block 13, an input block 14, and a display control block 15. Further, the image processing apparatus 1 is connected to a motion capture 16.

The processor 11 operates as instructed by a program stored in the storage block 12, thereby controlling the communication block 13, the input block 14, the display control block 15, and so on. It should be noted that the program mentioned above may be one that is provided as stored in a computer-readable storage medium such as flash memory or the like or as provided via a network such as the Internet or the like.

The storage block 12 is made up of a memory element such as a dynamic random access memory (DRAM), a flash memory, or the like. The storage block 12 stores the program mentioned above. Further, the storage block 12 stores information and computation results entered from the processor 11, the communication block 13, and so on. It should be noted that the storage block 12 may be made up of a storage apparatus such as a hard disk drive.

The communication block 13 is made up of an integrated circuit constituting a wired local area network (LAN) or a wireless LAN, a connector, an antenna, and so on. The communication block 13 has capabilities of communicating with other apparatuses via a network. Under the control of the processor 11, the communication block 13 enters information received from other apparatuses into the processor 11 or the storage block 12 and sends the information to other apparatuses.

The input block 14 is a circuit for acquiring inputs from the hardware for detecting manipulations done by a user. The input block 14 acquires input signals from the motion capture 16 and input devices such as a keyboard and a controller and enters the information with these input signals converted into the processor 11 or the storage block 12.

The display control block 15 includes a circuit for controlling display output devices such as a head-mounted display. Under the control of the processor 11, the display control block 15 displays images on a display output device.

The motion capture 16 is a device for measuring hand position, hand direction, and finger angle. The motion capture 16 is a camera capable of measuring a so-called data gloves and three-dimensional positions, for example. In the present embodiment, the motion capture 16 is connected to the image processing apparatus 1; however, it is also practicable to be built inside the image processing apparatus 1.

Figure 2:
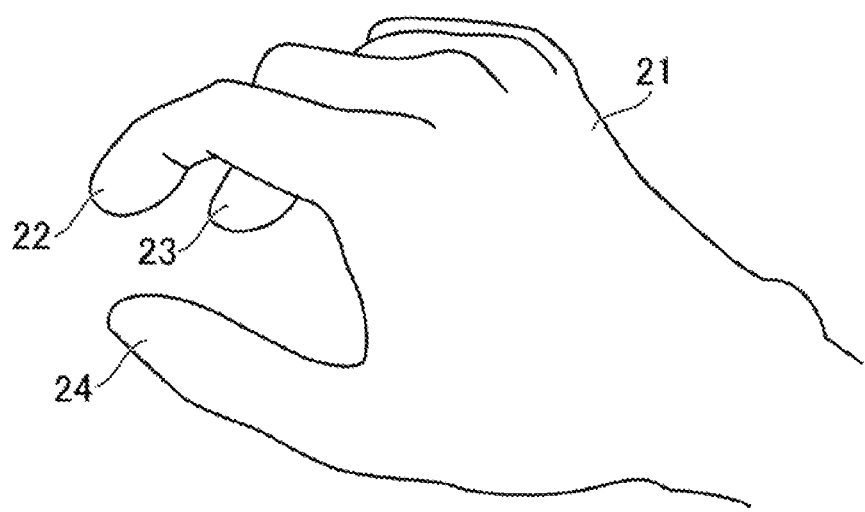
FIG. 2 is a diagram illustrating one example of a hand with which a motion is captured in one real space.
Figure 3:
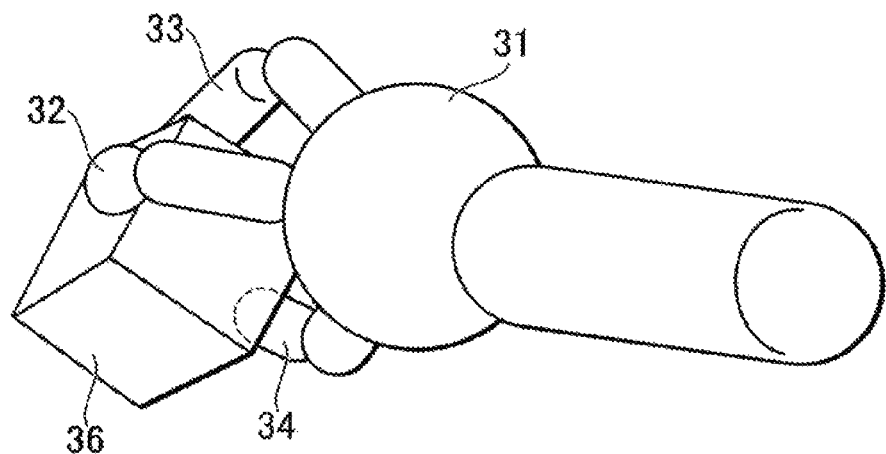
FIG. 3 is a diagram illustrating one example of a hand in a virtual space.

The following describes an overview of manipulations based on the present embodiment. FIG. 2 is a diagram illustrating one example of a hand 21 of which motions are acquired in a real space. Also, FIG. 3 is a diagram illustrating one example of a hand 31 in a virtual space. The image processing apparatus 1 related with the present embodiment acquires the position and direction of the hand 21 of a user and the directions and bending angles of the three fingers, namely, the index finger 22, the middle finger 23, and the thumb 24 that are included in that hand 21. Further, the image processing apparatus 1 moves the hand 31, a first finger 32, a second finger 33, and a third finger 34 inside the virtual space on the basis of the position and direction of that hand 21 and the directions and bending angles of the three fingers. Here, a finger bending angle may be an angle between two portions each connected to a finger joint or an angle measured by regarding that the two portions interconnected by a part of the finger joints integrally move as with an angle formed by a line connecting the finger's second joint and third joint relative to the line connecting the finger's second joint and the fingertip.

The first finger 32 corresponds to the index finger 22, the second finger 33 corresponds to the middle finger 23, and the third finger 34 corresponds to the thumb 24. An angle at which the joint of the first finger 32 is determined in accordance with an angle at which each joint of the index finger 22 bends. The same holds with the second finger 33 and the third finger 34. In the example illustrated in FIG. 3, an object 36 is a cuboid that is gripped by the first finger 32, the second finger 33, and the third finger 34.

Figure 4:
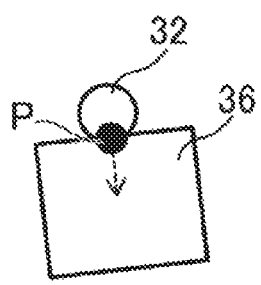
FIG. 4 is a diagram illustrating a contact mode between an object and a hand.
Figure 4:
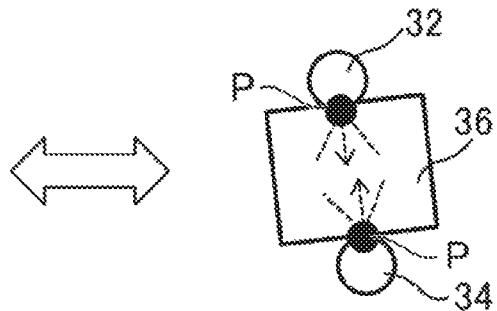
Figure 4:
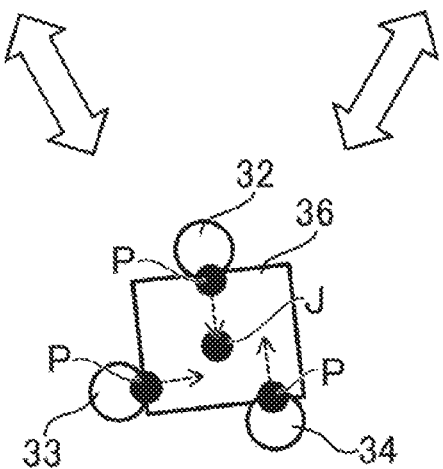

FIG. 4 is a diagram for describing a contact mode between the object 36 and the hand 31. The image processing apparatus 1 related with the present embodiment allows intuitive manipulations suited to the intention of a user by changing parameters related with the interaction between the hand 31 and the object 36 in accordance with contact mode. There are three types of contact modes; namely, a touch mode in which the number of fingers touching the object 36 is only one, a fric mode in which the number of fingers is two, and a fix mode in which the number of fingers is three or more. The touch mode is equivalent to a state in which the user is attempting to touch the object 36 and the fric mode is equivalent to a state in which the user is putting the object 36 between fingers. The fix mode is equivalent to a state in which the user grasps the object 36. In the touch mode and the fric mode, a force from contact point P between the object 36 and a finger is applied to the object 36. In the touch mode and the fric mode, different interaction parameters are set. Details of the interaction parameters will be described later. On the other hand, in the fix mode, the object 36 is fixed to the hand 31 of the user. To be more specific, in the fix mode, the image processing apparatus 1 moves the object 36 and the hand 31 inside the virtual space such that the relative speed between fix point J of the object 36 and the hand 31 of the user becomes 0.

Figure 5:
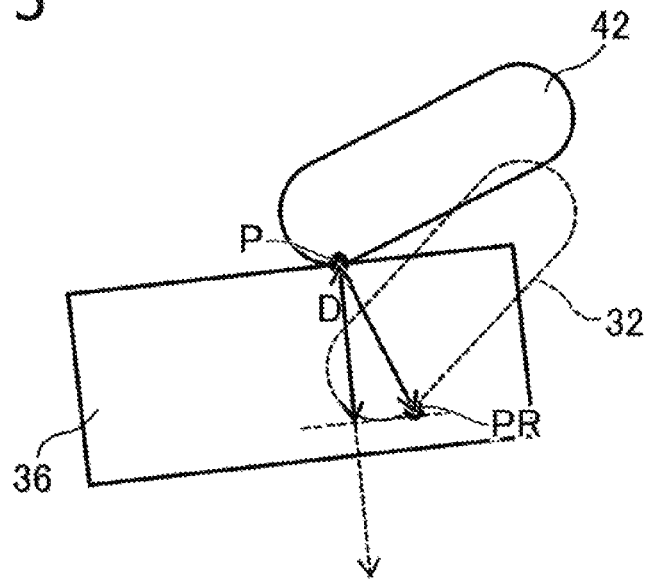
FIG. 5 is a diagram illustrating one example of a relation between a position of a first finger and a position of a touching finger in the virtual space.

FIG. 5 is a diagram illustrating one example of a relation between the position of the first finger 32 inside the virtual space and a touching finger 42. In the image processing apparatus 1 related with the present embodiment, the superimposition of the first finger 32 on the object 36 is allowed inside a virtual space. The position and direction of the first finger 32 referred to here are those obtained by converting the position and direction of the finger in the real space obtained by the motion capture 16 into the virtual space. Further, the touching finger 42 is one that is provided by moving the position of the first finger 32 so as to touch the surface of the object 36, the contact point P between the touching finger 42 and the object 36 being used for the computation of the interaction between the first finger 32 and the object 36. It should be noted that, in the drawings for use in the description of the present embodiment, the touching finger 42 may sometimes be written as the first finger 32 or the like for the ease of description.

Further, the size of the superimposition between the first finger 32 and the object 36 is used for the computation (the computation of the friction force between the first finger 32 and the object 36, for example) of the interaction. The degree of superimposition may be depth D from the surface of the object 36 of contact point PR in the first finger 32, for example. Here, the contact point PR exists on the surface of the first finger 32 and the relative position of the contact point P relative to the touching finger 42 is the same as the contact point PR relative to the first finger 32. Details of this processing will be described later. It should be noted that the same holds with the second finger 33 and the third finger 34 as the first finger 32.

Figure 6:
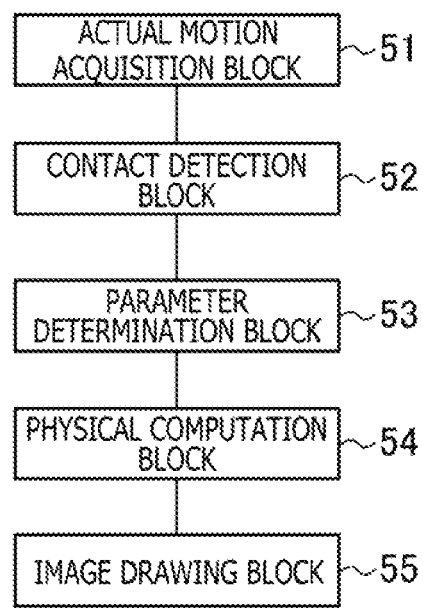
FIG. 6 is a block diagram illustrating functions that are realized by an image processing apparatus.

The following describes in more detail the functions and processing that are realized by the image processing apparatus 1. FIG. 6 is a block diagram illustrating the functions to be realized by the image processing apparatus 1. The image processing apparatus 1 functionally has an actual motion acquisition block 51, a contact detection block 52, a parameter determination block 53, a physical computation block 54, and an image drawing block 55. The actual motion acquisition block 51 is realized mainly by the execution of a program stored in the storage block 12 by the processor 11, the acquisition of information from the motion capture 16 via the input block 14, the processing of this information, and the storage of the processing results into the storage block 12. The contact detection block 52, the parameter determination block 53, and the physical computation block 54 are realized mainly by the execution of a program stored in the storage block 12 by the processor 11, the processing of information stored in the storage block 12 or the like, and the storage of the processing results into the storage block 12. The image drawing block 55 is realized mainly by the execution of a program stored in the storage block 12 by the processor 11, the processing of information stored in the storage block 12 or the like, and the controlling of the display control block 15 so as to have a display output device display an image.

On the basis of a signal from the motion capture 16, the actual motion acquisition block 51 acquires a motion of the hand 21 and stores the information related to the motion of the hand 21 into the storage block 12. The motion of the hand 21 includes the motion of fingers of that hand 21. It should be noted that the actual motion acquisition block 51 may also acquire a motion which is different from the fingers of the real hand 21 as the motion of the hand 21; for example, the actual motion acquisition block 51 may acquire hand position and finger bending/unbending commands from a controller.

On the basis of the motion of the hand 21 acquired by the actual motion acquisition block 51, the contact detection block 52 detects the contact between a finger and the object 36 in the virtual space. It should be noted that, if the travel amount of the finger from the detection of the contact between the finger and the object 36 is in excess of a predetermined threshold value, the contact detection block 52 regards that, even if there is superimposition between the finger and the object 36, there is no contact between the finger and the object 36, thereby detecting no contact.

The parameter determination block 53 detects the number of fingers in contact with the object 36 inside the virtual space on the basis of the detected contact and, on the basis of the detected number of fingers, determines interaction parameters for obtaining the interaction between the finger and the object 36. Further, the interaction parameters include a friction parameter related with friction which is computed on the basis of a friction coefficient determined by the number of fingers and the size of the superimposition between the finger and the object 36. Besides, the parameter determination block 53 determines constraint conditions in accordance with interaction parameters, these constraint conditions providing constraints between the hand 31 to which the fingers belong and the object 36.

On the basis of the determined interaction parameters and constraint conditions, the physical computation block 54 computes a motion of the object 36. The physical computation block 54 computes a motion of the object 36 in accordance with a procedure for simulating physical laws.

On the basis of the computed motion of the object 36, the image drawing block 55 draws a three-dimensional image of the object 36.

Figure 7:
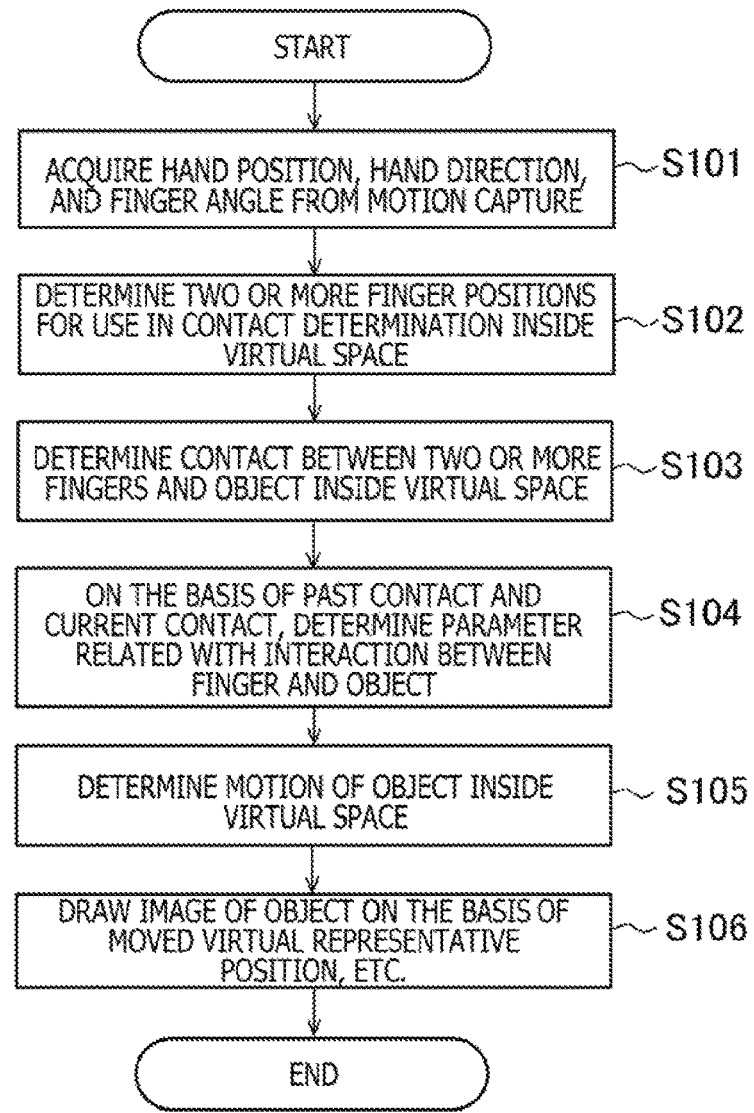
FIG. 7 is a flowchart indicative of one example of processing that is executed by the image processing apparatus.

FIG. 7 is a flowchart indicative of one example of the processing that is executed by the image processing apparatus 1. The processing illustrated in FIG. 7 is repetitively executed for every frame (every time the period of a frame passes). In what follows, details of the processing of each of the functions will be described along the flow of the processing. First, the actual motion acquisition block 51 acquires a position of the hand 21 captured by the motion capture 16, a direction of the hand 21, an angle of the finger, and so on through the input block 14 by an operation of the processor 11, thereby storing the information such as the position of the hand 21, the direction of the hand 21, the angle of the finger, and so on into the storage block 12 (step S101).

Figure 8:
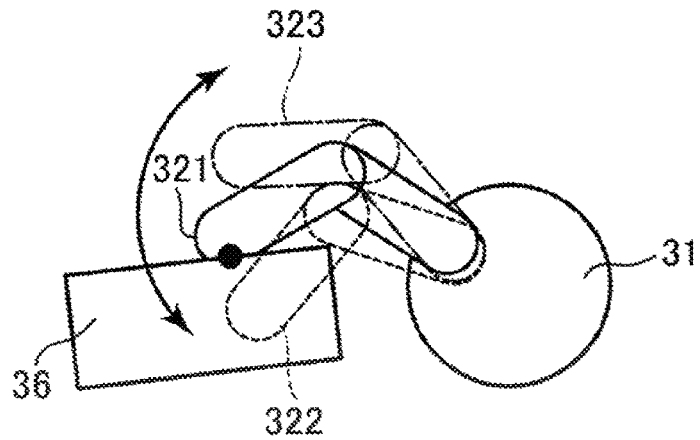
FIG. 8 is a diagram illustrating one example of a relation between an angle of a finger equivalent to a real space and an angle of finger for use in contact determination.

Next, the contact detection block 52 determines portions of two or more fingers for use in the contact determination (for determination) inside a virtual space (step S102). The positions of two or more fingers for determination are the positions of fingers in a coordinate system of the virtual space which are generated by coordinate-converting the positions of fingers of the hand 21 in a real space, for example. FIG. 8 is a diagram illustrating one example of a relation between a finger angle equivalent to the real space and a finger angle for use in contact determination. If the contact between a finger (the first finger 32, for example) and the object 36 was detected in the last frame, then the contact detection block 52 sets the angle of the finger such that the angle of the finger will not get higher than the angle (hereafter referred to as "lock angle") in the frame with which the contact was first detected. In the example illustrated in FIG. 8, if the acquired angle of a first finger 322 is equal to or higher than the lock angle of a first finger 321 in the frame with which the contact was first detected, the angle of the finger for use in contact determination becomes the lock angle. Further, if the acquired angle of a first finger 323 is equal to or lower than the lock angle, then the angle of the finger for use in contact determination becomes the acquired angle of the finger. It should be noted that the processing using this lock angle may not be executed; however, this processing allows a user to manipulate the object 36 more comfortably.

Figure 9:
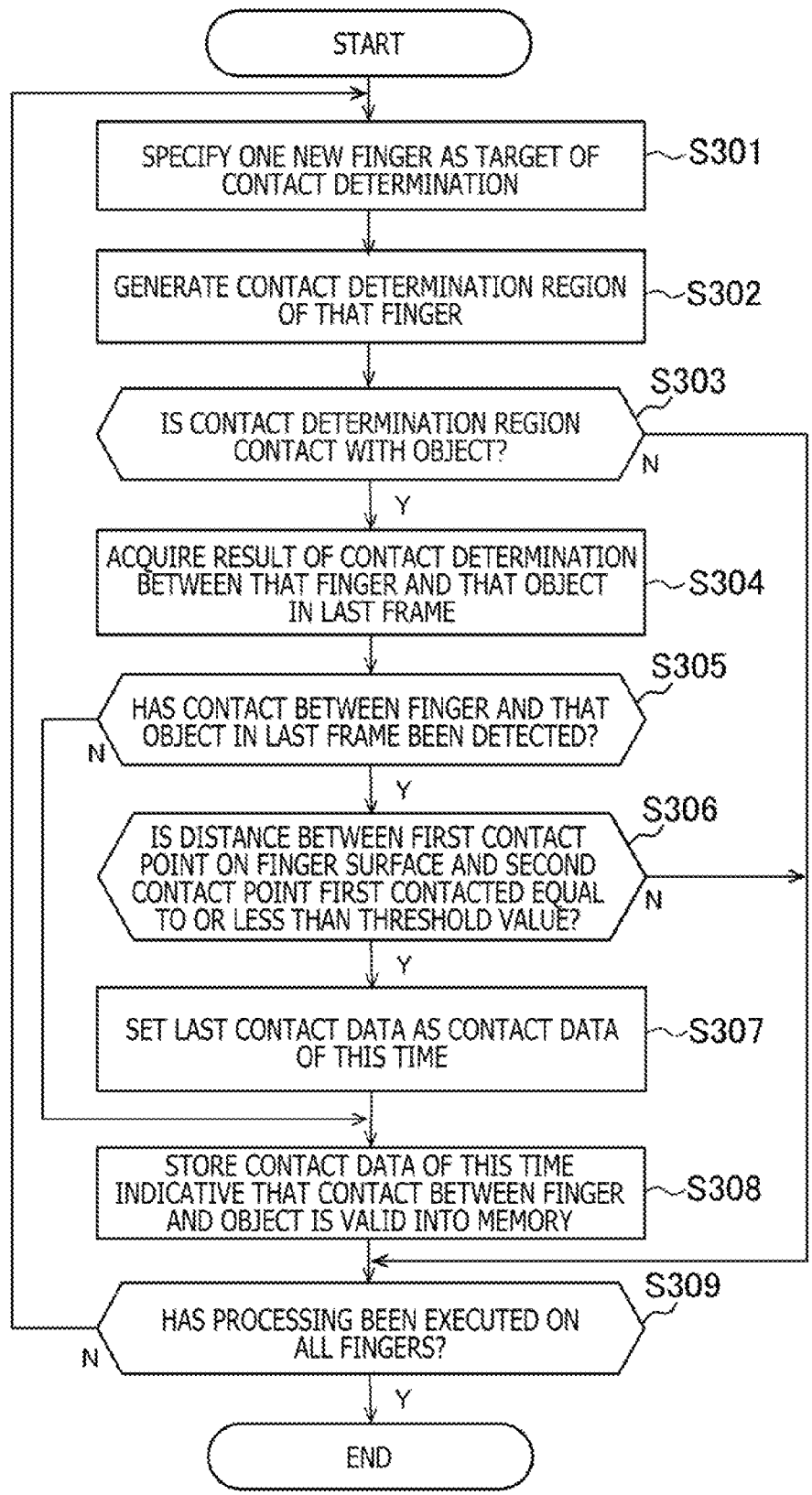
FIG. 9 is a flowchart indicative of processing that is executed by a contact detection block.

On the basis of the positions of two or more fingers for use in contact determination, the contact detection block 52 detects the contact between the two or more fingers inside the virtual space and the object 36 (step S103). FIG. 9 is a flowchart indicative of the processing that is executed by the contact detection block 52. FIG. 9 is a flow especially indicative of details of the processing of step S103.

In the processing of step S103, the contact detection block 52 first specifies a new one finger to be a target finger for contact determination (step S301). Then, the contact detection block 52 generates a contact determination region 37 inside the virtual space on the basis of the position and direction of the hand and the angle of the finger for determination (step S302).

Figure 10:
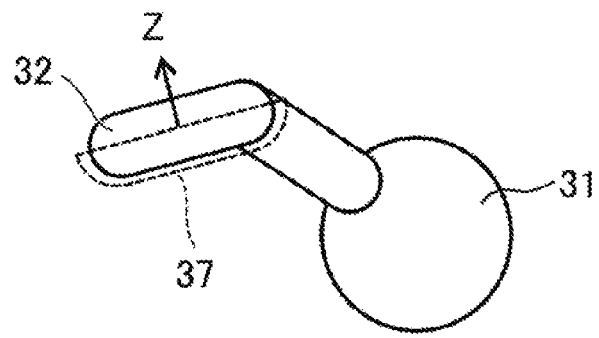
FIG. 10 is a diagram illustrating one example of a contact determination region.

FIG. 10 is a diagram illustrating one example of the contact determination region 37. In FIG. 10, the contact determination region 37 is indicated that is generated for the first finger 32. The contact determination region 37 is generated outside the portion near the fingertip of a finger such as the first finger 32 and, in the example depicted in FIG. 10, is on the side of the object 36 from the surface of a capsule equivalent to the fingertip, having a constant interval relative to the capsule equivalent to the fingertip. In what follows, the detection of the contact between the contact determination region 37 and the object 36 is also expressed as the superimposition between a finger such as the first finger 32, the second finger 33, or the third finger 34 and the object 36.

Next, the contact detection block 52 detects the contact between the generated contact determination region 37 and one of two or more objects 36 (step S303). If the contact between the contact determination region 37 and one of the objects 36 is detected (Y of step S303), the processing operations of step S304 and subsequent steps; if the contact is not detected (N of step S303), then the processing operations of step S304 and subsequent steps are skipped, thereby transitioning to the processing of step S309.

In the processing operations of step S304 through step S308, on the basis of the situation of a past contact between the finger to be determined for contact and the object 36 thereof, it is determined whether or not the contact this time is valid. In step S304, the contact detection block 52 acquires the results (the results that may be the same as the last contact data to be described later) of the determination of the contact between the finger of the last frame and the object 36 with which the contact was detected.

Then, if the contact between the finger and the object 36 thereof in the last frame (Y of step S305), it is determined whether distance L1 between first contact point P1 on the surface of the finger and second contact point P2 with which the contact was detected first time is equal to or less than a threshold value (step S306). A relative position of the first contact point P1 relative to the finger is the same as the relative position of the second contact point P2 between the touching finger 42 and the object 36 at the timing when the contact between the finger and the object 36 thereof was detected first time. Here, the distance L1 is equivalent to the travel amount of the finger from the detection of the contact between the finger and the object 36. It should be noted that the contact point on the side of the object 36 may be used for the second contact point P2. In this case, the relative position of the second contact point P2 relative to the object 36 is the same as the relative position of the contact point P between the touching finger 42 in the timing with which the contact between the finger and the object 36 was detected first time and the object 36.

Figure 11:
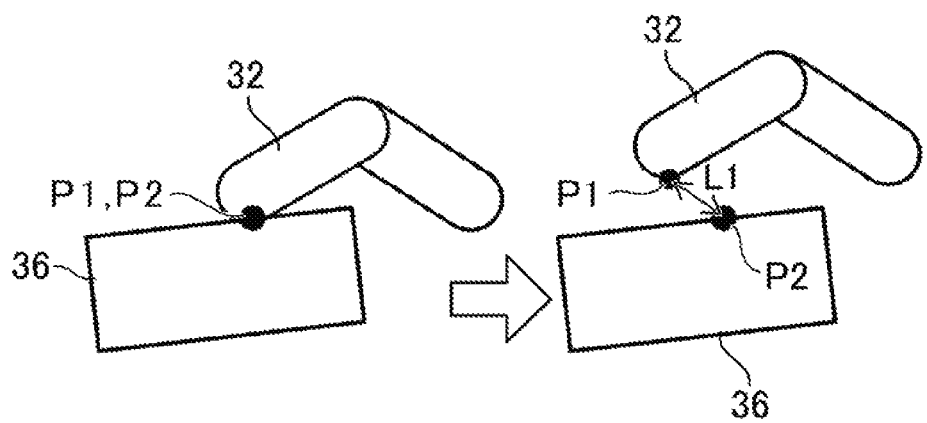
FIG. 11 is a diagram for describing a distance between a first contact point and a second contact point.

FIG. 11 is a diagram for describing the computation of the distance L1 between the first contact point P1 and the second contact point P2. For example, when the first finger 32 first comes in contact with the object 36, the first contact point P1 and the second contact point P2 are at approximately the same position. On the other hand, after the processing of several frames has passed, the first contact point P1 and the second contact point P2 are sometimes separated from each other because of the change in the positions and so on of the first finger 32. The contact detection block 52 computes the distance L1 between these first contact point P1 and second contact point P2. It should be noted that, in the example illustrated in FIG. 11, the first finger 32 is away from the object 36; however, in this example, the contact between the contact determination region 37 and the object 36 is detected. Further, even if the first finger 32 and the object 36 are superimposed on each other, the detection of the distance L1 may be executed in the same method.

Figure 12:
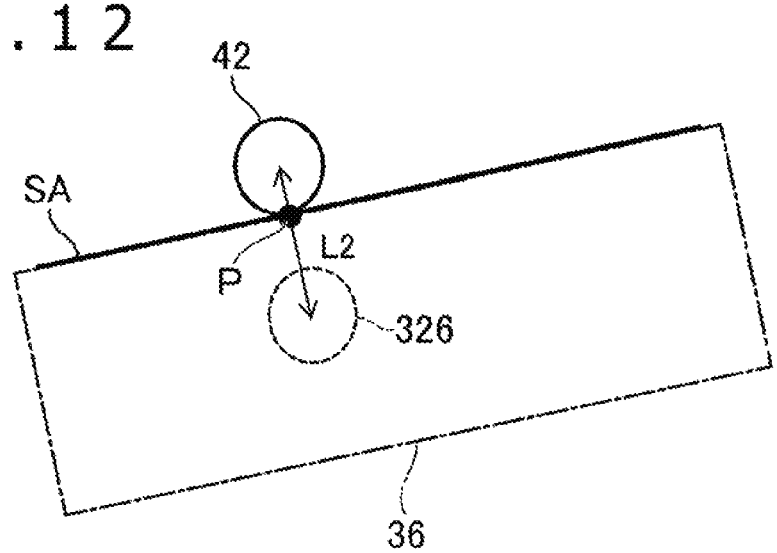
FIG. 12 is a diagram for describing a method of computing contact points.

FIG. 12 is a diagram for describing a contact point P computation method. In the example illustrated in FIG. 11, the touching finger 42 that touches area SA making up the surface of the object 36 is obtained from a finger for determination 326 so as to obtain the contact point P between the touching finger 42 and the surface of the object 36. In the computation of the contact point P, the contact detection block 52 determines, of the areas making up the object 36, one or more areas SA for use in obtaining the touching finger 42. Since the area SA is the same as the area for use in the detection of the contact between the object 36 and the contact determination region 37, details of the determination are skipped. Next, the contact detection block 52 computes the position of the touching finger 42 such that the touching finger 42 exists in the determined area and satisfies the conditions that distance L2 between the touching finger 42 and the finger for determination 326 is minimized. This computation method is equal to a method in which a so-called God object is obtained from the position of a finger with a finger in a real space converted.

Then, if the distance L1 between the first contact point P1 and the second contact point P2 is equal to or less than a determination threshold value (Y of step S306), the contact detection block 52 determines that the contact is valid, thereby setting the last contact data as the contact data in the current frame (step S307). On the other hand, if the distance L1 between the first contact point P1 and the second contact point P2 is larger than the determination threshold value (N of step S306), then the contact detection block 52 determines that the contact is invalid, thereby transitioning to the processing of step S309.

Further, if, in step S305, the contact between the finger and the object 36 is not detected in the last frame, then the contact detection block 52 determines that the contact is valid and skips the processing operations of steps S306 and S307, thereby transitioning to the processing of step S308.

In step S308, the contact detection block 52 stores, into as memory, the contact data in the current frame that is the contact data indicative of the validity of the contact between the target finger and one of the objects 36. The contact data exists for each finger, one piece of the contact data including a finger identification (ID) for identifying the finger, contact/non-contact information, the object ID of the object 36 to be touched, the coordinate of the contact point P, the normal line of the surface of the object 36 in the contact point P. It should be noted that, if the finger is kept touching to the same object 36 by the processing operations of steps S306 and S307, then the information at the time the finger and the object 36 touched each other for the first time is stored in the contact data.

The processing in step S308 and so on allows the prevention of a phenomena in which, due to the fluctuation in the movement of user fingers, the contact point P changes, thereby making the motion of the object 36 unstable. Further, step S306 allows the prevention of the motion of the object 36 from becoming unnatural because the contact point P does not change in the case where a travel takes place by other than finger fluctuation.

Then, in step S309, it is determined whether all fingers are made the target of the processing of contact determination (step S309). If all fingers are found not having been processed as the target of contact determination (N of step S309), then the processing returns to step S301. If all fingers are found having been processed as the target of contact determination (Y of step S309), the processing of step S103 is terminated.

If the contact between the two or more fingers and the object 36 inside the virtual space is determined, the parameter determination block 53 determines a parameter related with the interaction between the fingers and the object on the basis of at least one of the past contact and the current contact (step S104). This parameter related with the interaction includes the friction force between the fingers and the object 36 and a type of the constraint conditions between the fingers and the object 36. The following describes further details of the processing of step S104.

Figure 13:
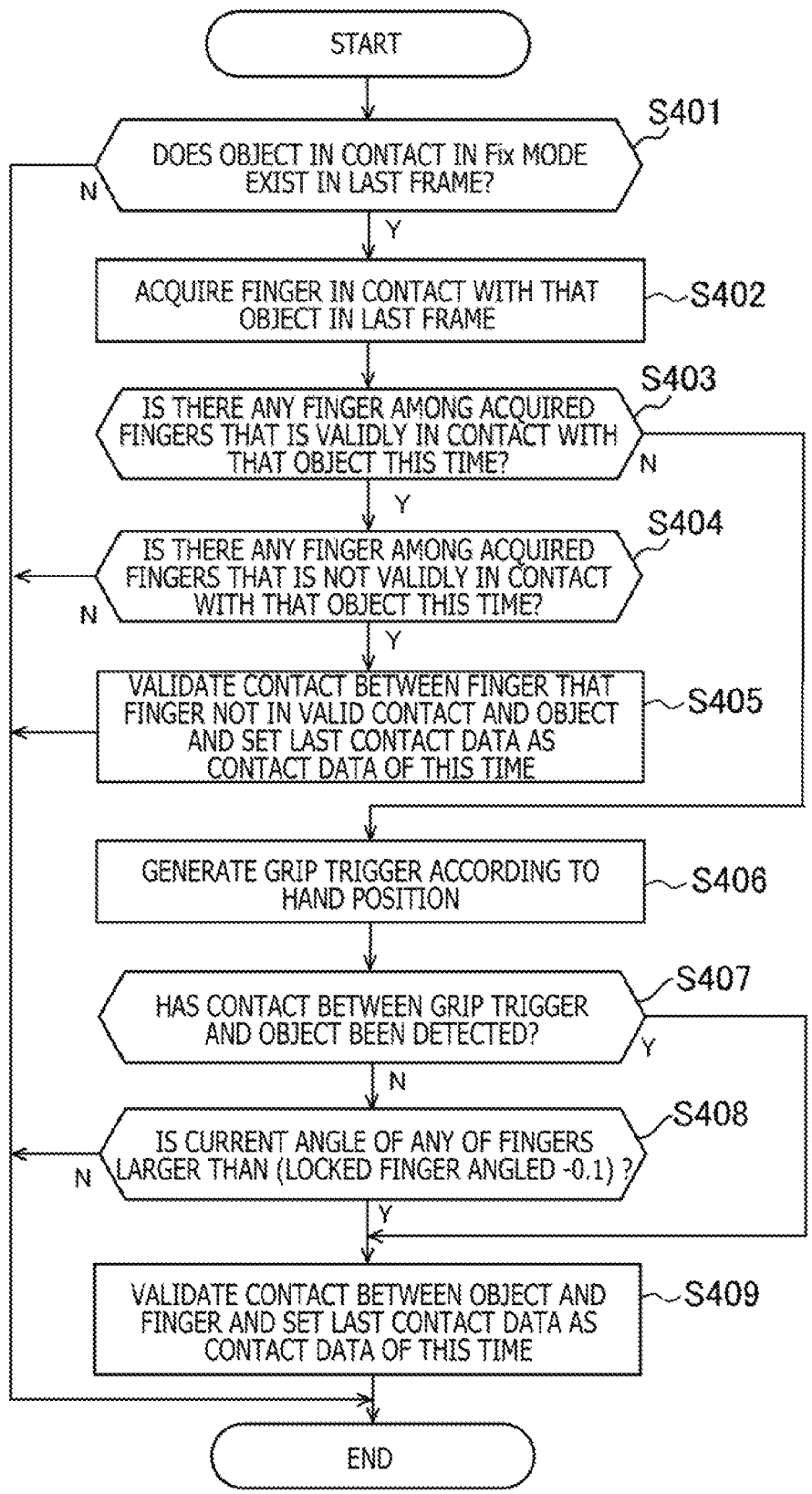
FIG. 13 is a flowchart indicative of processing that is executed by a parameter determination block.

FIG. 13 is a flowchart indicative of the processing to be executed by the parameter determination block 53. The processing illustrated in FIG. 13 is the processing for maintaining the fix mode under the conditions that predetermined conditions are satisfied even if the relation between the finger of the hand 31 and the object 36 in the last frame is the fix mode and the contact detection block 52 has not detected the contact between three or more fingers and the object 36. These predetermined conditions are conditions that are estimated that the user be intended to continue gripping the object 36, details thereof being described later.

First, the parameter determination block 53 acquires the contact mode between the hand or finger and the object 36 in the last frame so as to determine whether there is the object 36 touching the finger and the contact mode thereof is the fix mode (step S401). If the contact mode is not the fix mode (N of step S401), then the processing illustrated in FIG. 13 and subsequent processing operations are skipped.

If the contact mode is not the fix mode (Y of step S401), then the parameter determination block 53 acquires the fingers touching the object 36 in the last frame (step S402). If, of the acquired fingers, there is any finger validly touching the object 36 (Y of step S403) in the result of the processing by the contact detection block 52 of the current frame and, of the acquired fingers, there is any finger not validly touching the object 36 (Y of step S404), then the parameter determination block 53 determines that the contact between the finger not validly touching and the object 36 is valid. If the contact is determined valid, then the parameter determination block 53 sets the contact data of the finger in the last frame as the contact data of the finger in the current frame (step S405). It should be noted that, of the acquired fingers, if there is any finger not validly touching the object 36 (N of step S404), then the subsequent processing operations illustrated in FIG. 13 are skipped because the fix mode is determined from the beginning.

On the other hand, if there is no finger touching validly touching the object 36 (N of step S403), then it is determined whether or not the fix mode is to be maintained by another technique indicated in step S406 and subsequent steps. In step S406, on the basis of the current position of the contact point P on the side of two or more fingers validly touching the object 36 in the last frame, the parameter determination block 53 generates a grip trigger 38 that is a region for determining the contact between the object 36 and the hand 31 (step S406).

Figure 14:
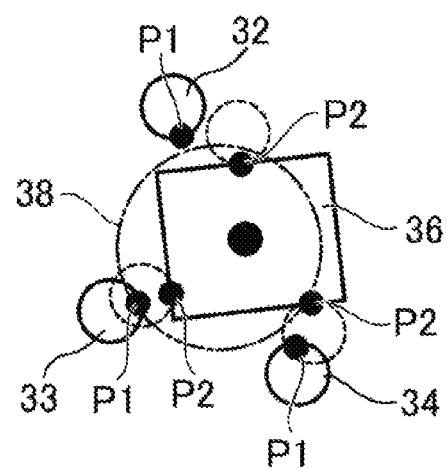
FIG. 14 is a diagram illustrating one example of a grip trigger.

FIG. 14 is a diagram illustrating the grip trigger 38. The grip trigger 38 may be generated on the basis of the current position (the position of the first contact point P1) of the contact point on the surface from the first finger 32 to the third finger 34, for example, or the grip trigger 38 may be a sphere centered at the center of gravity of the first contact point P1.

If the contact between the grip trigger 38 and the object 36 is detected (Y of step S407), the parameter determination block 53 determines to maintain the fix mode and transitions to the processing of step S409. On the other hand, if the contact between the grip trigger 38 and the object 36 is not detected (N of step S407), then it is determined whether or not the maintenance conditions to maintain the fix mode are satisfied (step S408). These maintenance conditions are that the current angle of any of the fingers touching the object 36 is greater than (angle −0.1 (rad) at which the angle is locked). This is because, if the current finger angle is greater than the angle at which the finger touched the object 36 first time, the probability that the user is intended to grip the object is high. It should be noted that the value of 0.1 rad that is subtracted from the locked angle may be appropriately changed by taking finger fluctuations into consideration.

If any of the fingers satisfies the maintenance conditions (Y of step S408), then it is determined to maintain the fix mode, transitioning to the processing of step S409. In step S409, the contact between the fingers validly touching the object 36 and the object 36 thereof in the last frame is made valid, thereby setting the contact data of these fingers in the last frame as the current contact data.

Figure 15:
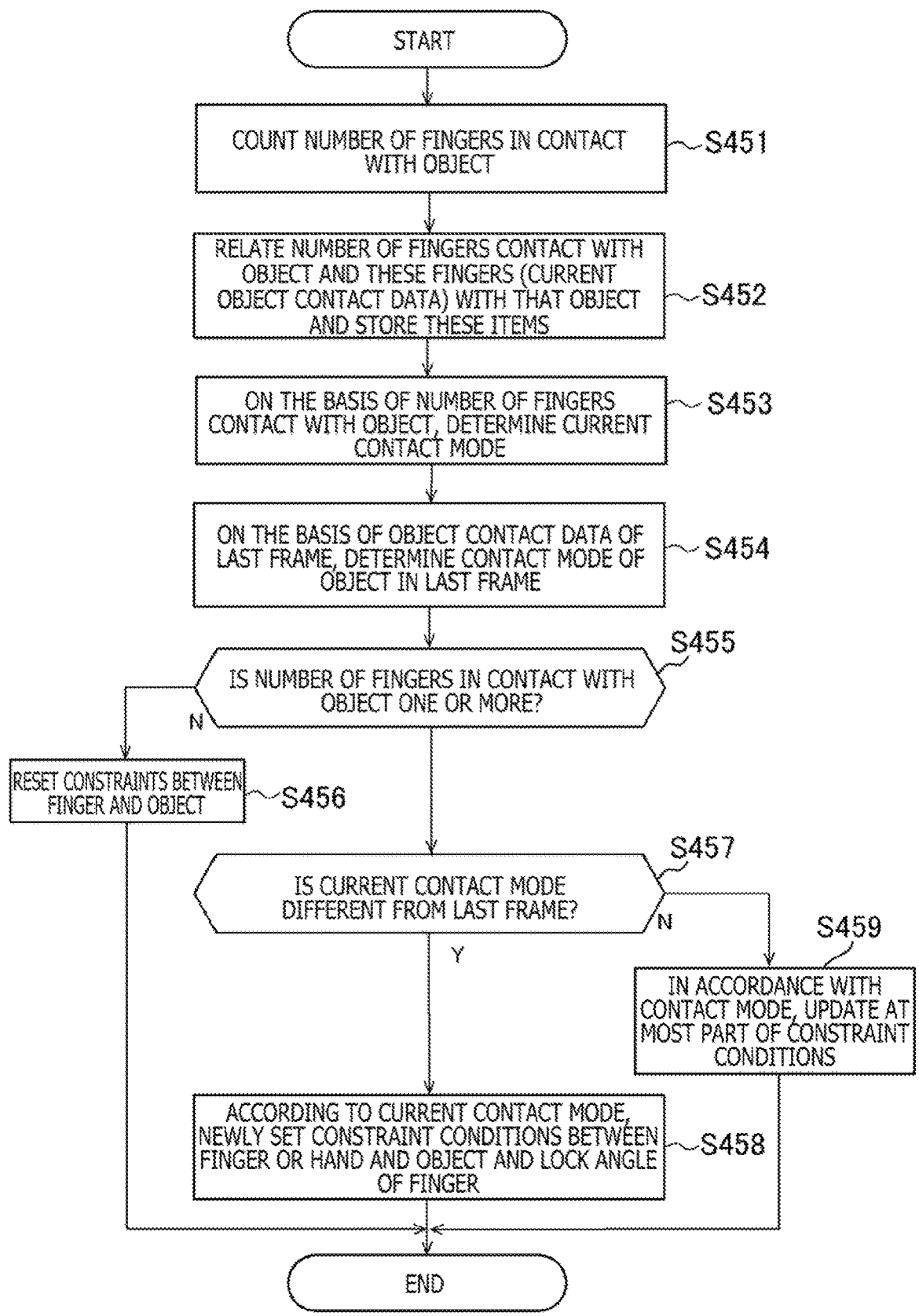
FIG. 15 is a flowchart indicative of processing that is executed by the parameter determination block.

FIG. 15 is a flowchart indicative of the processing of the parameter determination block 53. The processing illustrated in FIG. 15 is executed after the processing illustrated in FIG. 13. The processing illustrated in FIG. 15 is the processing for determining the contact mode between the finger and the object 36 on the basis of the number of fingers determined valid in the contact with the object 36 so as to determine an interaction parameter in accordance with that contact mode and the change in the contact mode. This processing may be executed for each object 36.

When the processing illustrated in FIG. 13 is executed, the parameter determination block 53 counts the number of fingers touching the object 36 (step S451). The number of fingers touching the object 36 is the number fingers with the contact with the object 36 determined valid by the contact detection block 52 in the example illustrated in FIG. 15. To be more specific, the parameter determination block 53 counts the number of items of contact data having the object IDs of the objects 36 for each object 36 from the current contact data. Then, on the basis of the counted number of items of contact data, the parameter determination block 53 relates the current object contact data with the objects 36 for each object 36 and stores the related object contact data (step S452). The object contact data includes the object ID for identifying the object 36, the number of fingers touching the object 36, and the finger ID of the touching finger.

Next, on the basis of the current number of fingers touching object 36, the parameter determination block 53 determines the current contact mode (step S453). To be more specific, if the number of fingers is 1, 2, or 3, the parameter determination block 53 selects the touch mode, the fric mode, or the fix mode as the contact mode, respectively. Further, on the basis of the object contact data of the last frame, the parameter determination block 53 determines the contact mode of the object 36 in the last frame (step S454). To be more specific, if the number of fingers to be stored in the last object contact data is 1, 2, or 3, then the parameter determination block 53 selects the touch mode, the fric mode, or the fix mode as the contact mode, respectively. It should be noted that, if the number of fingers is 0, the processing operations of steps S451 through S454 may be skipped or, if the number of fingers is more than three, the fix mode may also be selected as contact mode.

Then, if the number of fingers touching the object 36 is less than one (N of step S455), the parameter determination block 53 resets the constraint conditions between the fingers and the object 36 by regarding that there is not the contact any more (step S456). To be more specific, the parameter determination block 53 deletes the constraint conditions between the fingers and the object 36. Further, if there is no other object 36 touching fingers, the parameter determination block 53 also deletes the setting of lock angle for use in the processing of step S102 of the contact detection block 52. The deletion of lock angle freely changes the angle of finger for use in the contact determination until there occurs the next contact between finger and the object 36.

On the other hand, if the number of fingers touching the object 36 is one or more (Y of step S455), then the parameter determination block 53 determines whether or not the current contact mode between the object 36 and the fingers is different from the contact mode in the last frame (step S457). If the current contact mode is found different from the last contact mode (Y of step S457), then the parameter determination block 53 newly sets the constraint conditions between the hand 31 and the object 36 in accordance with the current contact mode, thereby locking the finger angle by storing the current angle of the finger touching the object 36 as a lock angle (step S458).

If the contact mode is touch mode or the fric mode, then the constraint conditions are conditions representative of the friction force and so on that are applied through the contact point P on the surface of the object 36. FIG. 16 is a diagram for describing constraint elements of the object 36; especially, if the contact mode is the touch mode or the fric mode, this drawing is indicative of the constraint elements between the finger and the object 36. A friction frustum 46 illustrated in FIG. 16 is indicative that there occurs a friction between the first finger 32 and the object 36 at the contact point P. Further, Y axis in FIG. 16 is in the same direction as the normal line of the surface of the object 36. X axis and Z axis are in the directions orthogonal to the normal line and the X axis and the Z axis are mutually orthogonal. "Twist" in FIG. 16 is indicative of a component that twistingly rotates around the axis that is the normal line and "swing" is indicative of a component that rotates the axis that is a line orthogonal to the normal line through the contact point P.

FIG. 17 is a diagram illustrating a constraint technique in accordance with the constraint elements of the object 36. For the positional travels in the X axis and Z axis directions, a so-called fixed joint is set in which a force is applied to the object 36 and the first finger 32 such that the relative speed with the first contact point on the side of the first finger 32 and the second contact point P2 on the side of the object 36 is minimized. Here, in order to represent friction, the upper limit of the force to be applied to the object 36 and the first finger 32 by this fixed joint is a static maximum friction force or a dynamic maximum friction force. On the other hand, for the positional travel in the Z axis direction, constraint conditions are provided so as to prevent the first finger 32 and the object 36 from reacting with each other, consequently sinking into each other. For the twist and swing components, the rotary angle is adjusted to a fraction of an actual rotary angle. If the contact mode is the touch mode or the fric mode, the parameter determination block 53 determines the constraint conditions for these elements for each touching finger.

Here, the parameter determination block 53 sets a static friction coefficient (or a dynamic friction coefficient) depending on whether the contact mode is the touch mode or the fric mode. To be more specific, a static friction coefficient (or a dynamic friction coefficient) in the touch mode is set so as to be smaller than that in the fric mode. Further, on the basis of the size of the superimposition between the finger and the object 36 and the static friction coefficient (or the dynamic friction coefficient) thereof, the parameter determination block 53 computes a maximum static friction force. The size of the superimposition between the finger and the object 36 is depth D (refer to FIG. 5) from the surface of the object 36 of the first contact point P1 of a finger, for example. This setup suppresses an object from moving more than necessary in the touch mode in which it is assumed that the user be intended to touch the object 36, thereby preventing the occurrence of a phenomenon in which the object 36 slips in the fric mode in which it is assumed that the user be intended to put the object 36 between the fingers. This makes it practicable to execute intuitive manipulations.

In the description done so far, a fixed joint for constraining the fingers and the object 36 for the positional travels in the X axis and Z axis directions is set; however, it is also practicable for the parameter determination block 53 to set a fixed joint between a representative point PH representing the hand 31 and the second contact point P2 on the object 36. In this case, the parameter determination block 53 applies a force to the object 36 and the representative point PH such that a relative speed between the representative point PH and the second contact point P2 on the side of the object 36 is minimized. Therefore, a relative position between the representative point PH and the second contact point P2 is stored. The representative point PH is equivalent to the center of the base of a finger or the center of a palm, which is the position representative of a position of the hand 31.

Figure 19:
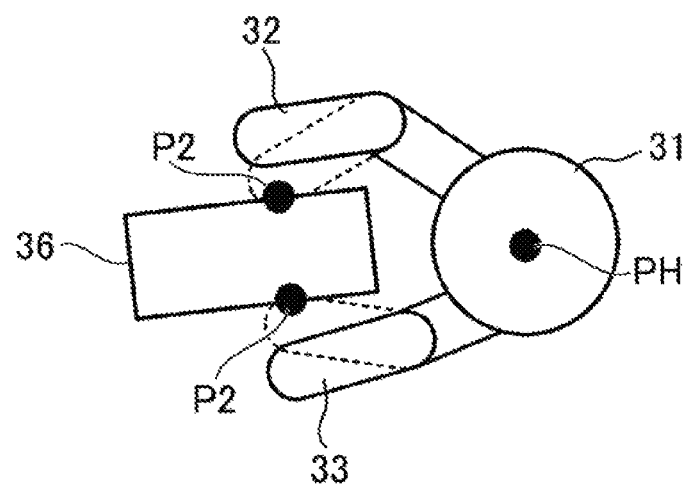
FIG. 19 is a diagram for describing a relation between an object and a hand.

FIGS. 18 and 19 are diagrams for describing relations between the object 36 and a virtual hand 31. Such fingers as the first finger 32 and the second finger 33 are easily fluctuate in the positions thereof. For example, even if the these fingers are in contact with the object 36 as illustrated in the FIG. 18, the position fluctuates due to the travel or the like of the hand 31 (refer to FIG. 19), there fluctuating the motion of the object 36 through the fixed joint. Therefore, by constraining the virtual hand 31 and the object 36 through a fixed joint, the influence of the fluctuation can be mitigated. It should be noted that a force generated by the constraint is applied to the second contact point P2 on the surface of the object 36.

If the contact mode is the fix mode, the parameter determination block 53 determines, as constraint conditions, conditions that a relative speed is 0 between the center of gravity of two or more contact points P on the surface of the object 36 that are contact points P between the object 36 and the finger and the position of representative point PH. In this case, it is assumed that the user be manipulating for gripping, so that the necessity for applying a friction force through the contact point P is low, thereby realizing intuitive manipulations with simple computations.

Here, if, in step S457, the current contact mode is the same as the last contact mode (N of step S457), then the parameter determination block 53 updates at most a part of the constraint conditions in accordance with the contact mode (step S459). To be more specific, if the contact mode is the touch mode or the fric mode, a maximum static friction force or a maximum dynamic friction force is updated on the basis of the size of the superimposition between the finger and the object 36. Use of different processing operations depending on whether or not the contact mode has transitioned can save the processing amount or prevent unstable motions.

As described above, changing the parameters (constraint conditions, friction coefficients, and the like) indicative of the interaction between the object 36 and the hand 31 or fingers in accordance with such situations as the number of fingers touching the object 36 allows the user to intuitively manipulate the object 36.

The invention claimed is:

1. An image processing apparatus comprising: acquisition circuit for acquiring a motion of a finger of a hand; contact detection circuit for detecting contact between the finger and an object in a virtual space; parameter determination circuit for detecting the number of fingers touching the object in a virtual space and, on the basis of the detected number of fingers, determining an interaction parameter for obtaining an interaction between the finger and the object; computation circuit for computing, on the basis of the determined interaction parameter, a speed of the object relative to the hand; and drawing circuit for drawing an object with the speed computed, wherein an interaction parameter for obtaining a force applied between the finger and the object includes a friction parameter applied to friction, the parameter determination circuit computes the friction parameter on the basis of a friction coefficient determined in accordance with the number of fingers and a size of superimposition between the finger and an object, and the computation circuit computes a speed of the object on the basis of the friction parameter.

2. The image processing apparatus according to claim 1, wherein the parameter determination circuit determines the interaction parameter on the basis of a size of superimposition between the finger and an object.

3. The image processing apparatus according to claim 1, wherein: the parameter determination circuit determines constraint conditions in accordance with the interaction parameter, the constraint conditions constraining between a hand to which the finger belongs and the object, and the computation circuit computes a speed of the object such that the constraint conditions are satisfied.

4. The image processing apparatus according to claim 1, wherein, if a travel amount of the finger after detection of contact between the finger and the object is in excess of a predetermined threshold value and there is superimposition between the finger and the object, the contact detection circuit does not detect the contact between the finger and the object.

5. The image processing apparatus according to claim 1, wherein, on the basis of an actual finger angle at a time when contact between the finger and the object is first detected and the actual finger angle of current time, the contact detection circuit determines finger angle for use in detection of contact so as to detect contact between the finger and the object on the basis of the determined finger angle.

6. The image processing apparatus according to claim 1 wherein: if the number of the detected fingers is three or more, the parameter determination circuit determines constraint conditions for fixing a relative position between the object and a hand to which the finger belongs, and the computation circuit computes a speed of the object such that the constraint conditions are satisfied.

7. The image processing apparatus according to claim 6, wherein, if a speed of the object is computed such that constraint conditions for fixing a relative position between the object and a hand to which the fingers belong in a last frame are satisfied and there is contact between the object and any one of the fingers in a current frame, the parameter determination circuit determines constraint conditions for fixing a relative position of the object and a hand to which the fingers belong.

8. An image processing method comprising: acquiring a motion of a finger of a hand; detecting contact between the finger and an object in a virtual space; detecting the number of fingers touching the object in a virtual space and, on the basis of the detected number of fingers, determining an interaction parameter for obtaining an interaction between the finger and the object; computing, on the basis of the determined interaction parameter, a speed of the object relative to the hand; and drawing an object with the speed computed, wherein an interaction parameter for obtaining a force applied between the finger and the object includes a friction parameter applied to friction, the method further includes computing the friction parameter on the basis of a friction coefficient determined in accordance with the number of fingers and a size of superimposition between the finger and an object, and the computing step further includes computing a speed of the object on the basis of the friction parameter.

9. A non-transitory, computer readable storage medium containing a computer program, which when executed by a computer, causes the computer to execute processing operations of: acquiring a motion of a finger of a hand; detecting contact between the finger and an object in a virtual space; detecting the number of fingers touching the object in a virtual space and, on the basis of the detected number of fingers, determining an interaction parameter for obtaining an interaction between the finger and the object; computing, on the basis of the determined interaction parameter, a speed of the object relative to the hand; and drawing an object with the speed computed, wherein an interaction parameter for obtaining a force applied between the finger and the object includes a friction parameter applied to friction, the processing operations further include computing the friction parameter on the basis of a friction coefficient determined in accordance with the number of fingers and a size of superimposition between the finger and an object, and the computing operation further includes computing a speed of the object on the basis of the friction parameter.

* * * * *